March 7, 1950   N. R. KRAUSE ET AL   2,499,998
REEL CONSTRUCTION
Filed July 26, 1946
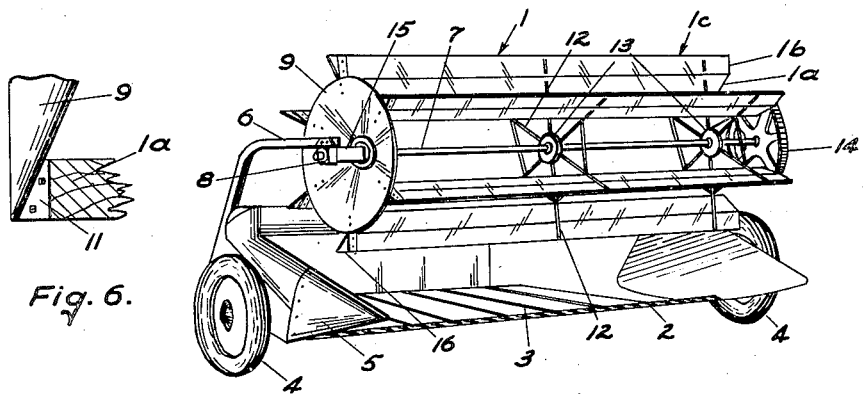
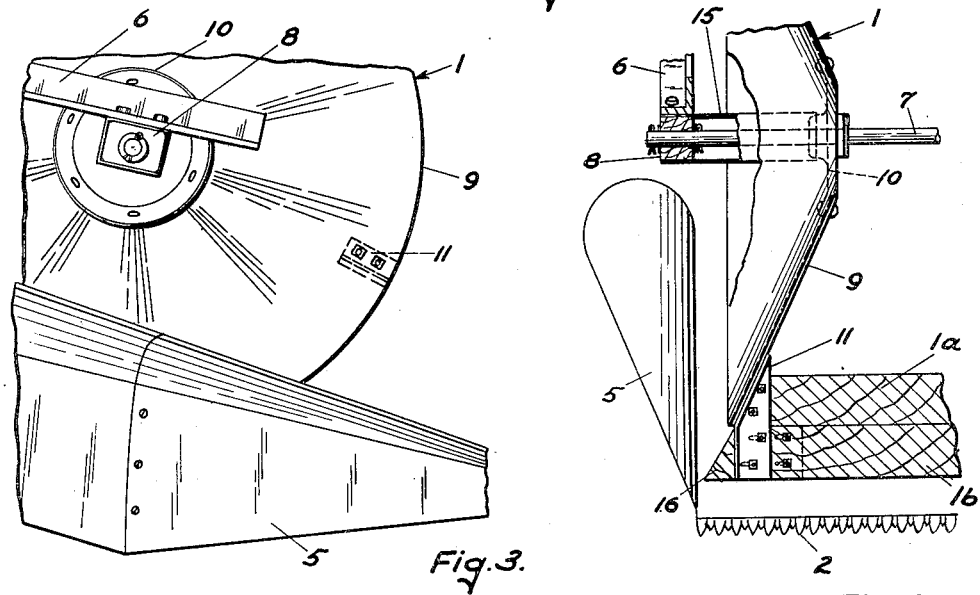
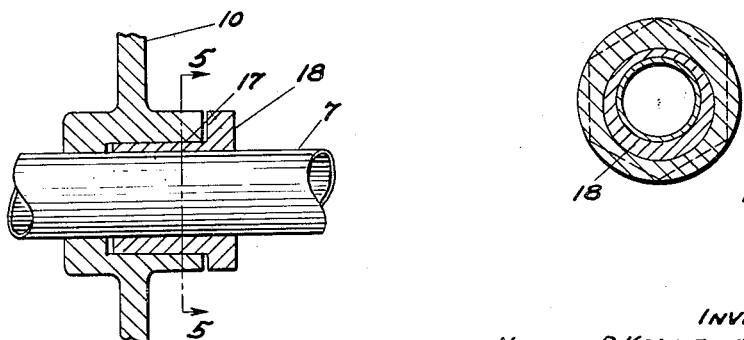
INVENTOR:
NORMAN R. KRAUSE &
CHARLES W. HANSEN
BY: Thiess Olson & Mecklenburger
ATTYS:

Patented Mar. 7, 1950

2,499,998

UNITED STATES PATENT OFFICE 2,499,998

REEL CONSTRUCTION

Norman R. Krause and Charles W. Hansen, Racine, Wis., assignors to J. I. Case Company, Racine, Wis., a corporation of Wisconsin Application July 26, 1946, Serial No. 686,534

6 Claims. (Cl. 56—220)

Our invention relates to a reel construction.

One of the objects of our invention is to provide a reel end construction for harvesters which will prevent the grain from hooking over the bats and bat-supporting means.

A further object is to provide a reel construction having improved means for holding the reel hub against slipping on the reel shaft.

Further objects and advantages of the invention will be apparent from the description and claims.

In the drawings, in which our invention is illustrated,

Figure 1 is a perspective view showing a windrower provided with a reel;

Fig. 2 is a front view showing the divider, a portion of the sickle, and a portion of the reel, parts being broken away;

Fig. 3 is a side view of the construction shown in Fig. 2;

Fig. 4 is a detail axial sectional view of the reel hub and shaft;

Fig. 5 is a section on the line 5—5 of Fig. 4; and

Fig. 6 is a detail view of a single bat reel construction.

Referring to the drawings in detail, the construction shown comprises a windrower provided with a reel 1 for urging the grain against the sickle 2 and pushing it over onto the endless conveyor 3 which delivers the grain at the right end, as viewed in Fig. 1, to form a windrow. The windrower is provided with the usual supporting wheels 4, divider 5, and reel-supporting arms 6. It may be drawn by means of a tractor.

The reel construction comprises a drive shaft 7 mounted in bearings 8 secured to the supporting brackets 6, a plurality of reel bats 1c, and means for supporting the reel bats and securing them to the shaft. In order to prevent the grain from hooking over the ends of the shaft 7, particularly at the divider or grain end of the windrower, a dished, conical, sheet metal reel head 9 is provided. This reel head is mounted on a flanged hub 10 secured to rotate with the reel shaft 7. Each reel bat 1c is secured to this concave end head 9 by means of angle brackets 11, one flange of which may be secured to the end head and the other flange of which may be secured to the reel bat 1c.

The intermediate portions of the reel bats and the portions adjacent the stubble side of the windrow may be secured to the shaft in any suitable manner, as by arms 12 secured at their outer ends to the reel bats and at their inner ends to flanged hubs 13 secured to the shaft 7. The reel 1 may be driven in any suitable manner by means of a sprocket wheel 14 secured to the end of the reel shaft.

In order to provide additional assurance against wrapping of the grain about the portion of the shaft 7 which extends beyond the reel head 9, we have provided a casing or housing 15 which extends around the bearing 8 in which the shaft 7 is mounted. This housing extends from the bearing to a position adjacent the hub 10 so that grain is prevented from wrapping around the rotating shaft extension.

Each reel bat may comprise two parallel slats 1a and 1b secured to the angle brackets 11. If desired, only one slat 1a may be used, as shown in Figs. 3 and 6, a correspondingly shorter bracket 11 being used. Also, if desired, two slats might be used and a small sectional slat 16 might be provided at the end of the bat to extend beyond the end of the conical reel head into proximity to the divider 5 as shown in Fig. 2.

In order that the reel shaft may drive the reel, the construction shown in Figs. 4 and 5 may be provided. In this construction, the reel hub 10 has at one end a circular hole in which the reel shaft 7 fits snugly. The hub is also provided with a cylindrical recess 17 larger in diameter than the hole in which the reel shaft fits and eccentric with respect to this hole. This cylindrical recess receives a member 18 which rotates freely in the recess 17. The member 18 is provided with a cylindrical hole therethrough eccentric with respect to the axis of the outer portion of the nut 18, the eccentricity of this hole being the same as the eccentricity of the hole in the hub with respect to its recess 17. With this construction, the nut is inserted into the recess in the hub to the position shown in Fig. 4, the member 18 being rotated to bring the holes in the nut and hub into alignment. The assembly of hub and member 18 is then slipped on over the end of the reel shaft 7 and brought to the desired position. A slight rotation of member 18 will clamp the reel securely to shaft 7. With this construction any rotative force acting on the reel shaft 7 against a resistance to rotation of the hub will cause a wedging or binding action between the shaft 7 and nut 18 and between the nut 18 and hub 10 which will insure that the shaft will drive the reel hub. A similar arangement is provided with respect to hubs 13, as shown in Fig. 4.

Further modifications will be apparent to those skilled in the art and it is desired, therefore, that the invention be limited only by the scope of the appended claims.

Having thus described our invention, what we claim and desire to secure by Letters Patent is:

1. A reel construction for a harvesting machine for forcing the standing grain toward the sickle comprising a rotatable shaft extending longitudinally of the sickle, a plurality of circumferentially spaced reel bats spaced about and extending longitudinally of the shaft, and means for supporting said bats on said shaft comprising an end head extending between said shaft and bats and substantially closing the end of the reel to prevent the grain from hooking over the bats and the bat-supporting means.

2. A reel construction for a harvesting machine for forcing the standing grain toward the sickle comprising a rotatable shaft extending longitudinally of the sickle, a plurality of circumferentially spaced reel bats spaced about and extending longitudinally of the shaft, and means for supporting said bats on said shaft comprising an end head extending between said shaft and bats and substantially closing the end of the reel to prevent the grain from hooking over the bats and the bat-supporting means, the ends of said bats abutting said end head.

3. A reel construction for a harvesting machine for forcing the standing grain toward the sickle comprising a rotatable shaft extending longitudinally of the sickle, a plurality of circumferentially spaced reel bats spaced about and extending longitudinally of the shaft, and means for supporting said bats on said shaft comprising a concave end head extending between said shaft and bats and substantially closing the end of the reel to prevent the grain from hooking over the bats and the bat-supporting means.

4. A reel construction for a harvesting machine for forcing the standing grain toward the sickle comprising a rotatable shaft extending longitudinally of the sickle, a plurality of circumferentially spaced reel bats spaced about and extending longitudinally of the shaft, means for supporting said bats on said shaft comprising a concave end head extending between said shaft and bats and substantially closing the end of the reel to prevent the grain from hooking over the bats and the bat-supporting means, said shaft extending to a position beyond said concave end head, means for supporting said shaft comprising a bearing outside said concave head, and a non-rotatably mounted housing surrounding the portion of the shaft between the bearing and end head to prevent grain from winding around said shaft extension.

5. A reel construction for a harvesting machine for forcing the standing grain toward the sickle comprising a rotatable shaft extending longitudinally of the sickle, a plurality of circumferentially spaced reel bats spaced about and extending longitudinally of the shaft, and means for supporting said bats on said shaft comprising a bat support having a hub portion having a cylindrical hole through which said shaft extends and in which it fits, and means for holding said hub against rotation with respect to said shaft comprising a collar having a cylindrical hole through which said shaft extends and in which it fits, said hub and collar having interengaging cylindrical surfaces surrounding said shaft and eccentric with respect thereto whereby relative rotation of said cylindrical surfaces will cause binding engagement between said shaft and the hub and sleeve.

6. A reel construction for a harvesting machine for forcing the standing grain toward the sickle comprising a rotatable shaft extending longitudinally of the sickle, a plurality of circumferentially spaced reel bats spaced about and extending longitudinally of the shaft, and means for supporting said bats on said shaft comprising a bat support having a hub portion having a cylindrical hole through which said shaft extends and in which it fits, and means for holding said hub against rotation with respect to said shaft comprising a collar having a cylindrical hole through which said shaft extends and in which it fits, said hub and collar having interengaging cylindrical surfaces surrounding said shaft and eccentric with respect thereto whereby relative rotation of said cylindrical surfaces will cause binding engagement between said shaft and the hub and sleeve, the cylindrical surface of the sleeve fitting inside the cylindrical surface of the hub.

NORMAN R. KRAUSE.
CHARLES W. HANSEN.

REFERENCES CITED

The following references are of record in the file of this patent:

UNITED STATES PATENTS

| Number | Name | Date |
| --- | --- | --- |
| 2,047,274 | Korsmo | July 14, 1936 |
| 2,092,643 | Erickson | Sept. 7, 1937 |
| 2,196,149 | Funk | Apr. 2, 1940 |
| 2,403,271 | Erickson | July 2, 1946 |